UNITED STATES PATENT OFFICE.

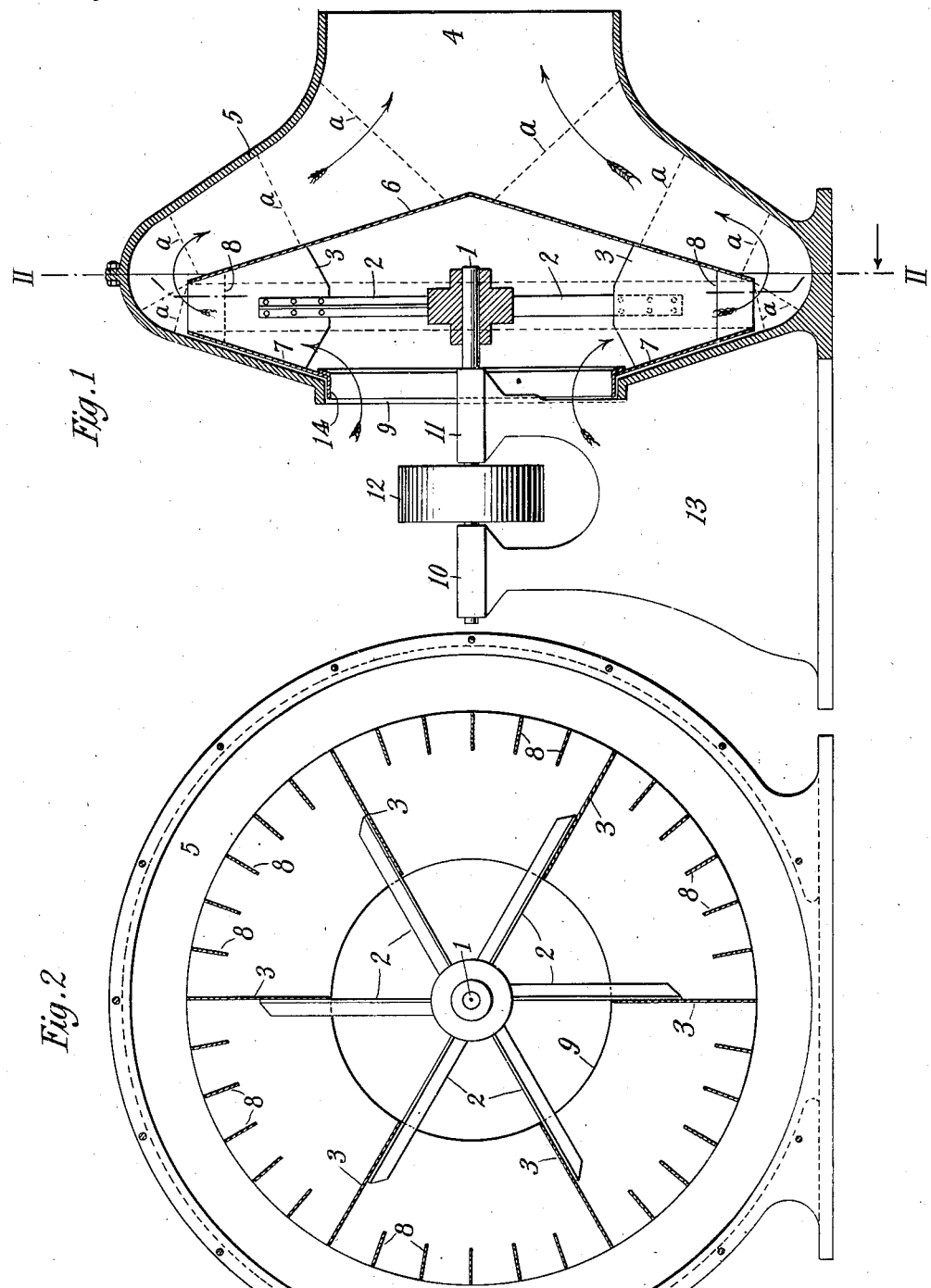

EDWIN BASSLER, OF CHICAGO, ILLINOIS, ASSIGNOR TO THE GREEN FUEL ECONOMIZER COMPANY, OF MATTEAWAN, NEW YORK, A CORPORATION OF NEW YORK.

PRESSURE-BLOWER.

No. 928,624.      Specification of Letters Patent.      Patented July 20, 1909.

Application filed May 5, 1905. Serial No. 259,045.

*To all whom it may concern:*

Be it known that I, EDWIN BASSLER, a citizen of the United States, and a resident of Chicago, in the county of Cook and State of Illinois, have invented certain new and useful Improvements in Pressure-Blowers, of which the following is a specification, reference being had to the drawing accompanying and forming part of the same.

My invention relates to fan blowers for delivering air under pressure, and has for its chief object to provide a device of this kind which shall be capable of delivering a very large volume of air at maximum pressure. A number of fan blowers having a similar end in view have been devised, but my invention contemplates certain improvements which, so far as I am aware, have never before been used.

The fan wheel which I prefer to employ in my invention has straight blades, as opposed to blades of the so-called "scroll" type, and they are arranged in radial planes passing through the axis. A number of the blades, as for example six, are of larger size than the others, and are carried on radial arms. Between the larger blades is a suitable number of smaller ones, similarly arranged, and supported in any convenient manner. The casing inclosing the fan is of special form and proportions, being constructed so that the air at no time has to pass through a space of less cross-section than the outlet through which it leaves the apparatus. The result is that there are no restricted passages and the air at no time is required to travel at a higher speed than that at which it is used. By this means conflicting currents are avoided and the efficiency of the apparatus greatly increased. The construction of the apparatus also provides a minimum length of travel for the air from inlet to outlet.

Referring now to the drawing, which shows the preferred embodiment of the invention, Figure 1 is a longitudinal section, and Fig. 2 is a transverse section, on line II—II.

Extending radially from the shaft 1 and carried rigidly thereby are six arms, 2, of T-steel. Mounted on the ends of the arms are larger blades 3, each being wider at the base than the top, as shown, and all of the same size. On the rear of the wheel, that is, on the side next the outlet 4 of the casing 5, is a disk 6, preferably of conical form and preferably extending to the outer edge of the series of blades 3. This disk closes the rear face of the wheel and causes the air, in leaving the wheel, to pass out at the periphery, between the blades, as clearly indicated by the arrows in Fig. 1. On the forward side, that is, on the face adjacent to the inlet of the casing, is a ring 7 of slightly conical form, secured in any convenient manner to the large blades 3. Spaced equidistant between the latter, and extending from the ring 7 to the disk 6, are small blades, as 8, approximately one-fourth the length of the large blades.

The casing 5 is made in two parts, as indicated. The form of the casing is substantially as shown in the drawing. The inlet opening 9, in the forward section, and the outlet 4 are of the same capacity, and are about as large in diameter as the opening in the wheel between the large blades. The wheel fits closely to the forward section, as shown, and the rear section is also of a general conical form. The wheel and casing are so proportioned that the cross sectional area of the passage between the disk 6 and the wall of the casing, perpendicular to the flow of air, as indicated in a few places by the dotted lines *a*, is at no place less than the cross-section of the outlet, which, it will be remembered, is of the same size as the inlet. While the radius of the passage is constantly decreasing toward the outlet the decrease is at least partially compensated by the divergence of the disk 6 and the casing wall, so that at no place is the passage so restricted as to cause the air to travel at a higher speed than through the outlet. The air is discharged, as gathered, entirely around the periphery of the wheel, and the cross sectional area between the ring 7 and disk 6 is preferably everywhere the same as the inlet of the casing, so that the air enters the casing and wheel, leaves the latter, and then leaves the casing, at substantially the same velocity. As a result, the conflicting currents, and objectionable back-pressure due to such currents, which have been so commonly met with in blowers as hitherto constructed, are eliminated. At the same time the design of the casing and wheel is such, as will be seen from the drawing, that the air has a minimum travel from inlet to outlet.

The shaft 1, which carries the fan-wheel, is mounted in bearings 10, 11, and is driven by a single pulley, 12. The standard or hanger 13 which supports the bearings may be of any suitable construction, and may be cast integral with the front section of the casing.

If desired, the ring 7 may have a flange, as the angle iron 14, fitting the edge of the inlet opening, to secure minimum loss in pressure.

The apparatus herein described is designed chiefly for blowing air into a closed chamber, the pressure generated being determined by the width of the wheel. It can, however, be used for cupolas, oil-burners, gas-house blowers, and in general for all work where the pressure desired is not greater than can be developed by a fan blower. For lower pressures the wheel can be widened, and then used for reverberatory furnace work. Although primarily a blower, the apparatus can be used for exhausting gases, etc., by connecting the inlet opening with the chamber from which the air or other gas is to be drawn. Another advantage is found in the fact that the wheel can be run in either direction with the same results.

The construction herein specifically described is of course merely one embodiment of the invention, which may be embodied in a great variety of concrete forms without departure from its proper scope.

What I claim is:

1. In a blower, fan-wheel having a plurality of tapered blades at its periphery, leaving an opening at its center, a disk carried by and covering one side of the wheel and extending substantially to the periphery, and a ring on the other side of the wheel, closing the spaces between the blades, but leaving the center of the wheel open, whereby the air will be discharged from the periphery of the wheel, as set forth.

2. In a blower, a fan-wheel having a plurality of radial arms, blades carried at the ends of the arms, the said blades being outwardly tapered, a conical disk carried by and closing one side of the wheel, and a conical ring on the other side, closing the spaces between the blades, but leaving the center of the wheel open, as set forth.

3. In a blower, a fan-wheel having a plurality of large blades at its periphery, a disk carried by and covering one side of the wheel, a ring carried by the other side of the wheel, closing the spaces between the blades but leaving the center of the wheel open, and a plurality of small blades at the periphery of the wheel, between the large blades and extending from the said disk to the said ring, as set forth.

4. In a blower, the combination of a casing having an inlet and an outlet of substantially equal size, and having its body portion enlarged between the inlet and outlet; a fan wheel in the casing adjacent the wall around the inlet and spaced away from the wall around the outlet, said wheel comprising radial arms carrying axially extending outwardly tapering blades, a conical disk carried by and closing the side of the wheel next to the outlet, a conical ring carried on the other side of the wheel and closing the spaces between the said blades but leaving an opening at the center of the wheel of substantially the same size as the inlet of the casing, and a plurality of relatively small blades at the periphery of the wheel and extending axially from the said ring to the said disk; and a shaft for the wheel extending out through the inlet of the casing and journaled in bearings outside of the casing, as set forth.

EDWIN BASSLER.

Witnesses:
J. F. BARRY,
H. G. ELDER.